(12) United States Patent
Johnson et al.

(10) Patent No.: US 6,593,883 B2
(45) Date of Patent: Jul. 15, 2003

(54) TIMING ESTIMATION METHOD AND APPARATUS FOR A LOCATION SYSTEM

(75) Inventors: Mark J. Johnson, Cary, IL (US); Christopher Page, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/891,594

(22) Filed: Jun. 25, 2001

(65) Prior Publication Data

US 2002/0196184 A1 Dec. 26, 2002

(51) Int. Cl.$^7$ ................................................ G01S 1/24
(52) U.S. Cl. ........................................ 342/387; 342/465
(58) Field of Search .............................. 342/388, 387, 342/461, 458, 465

(56) References Cited

U.S. PATENT DOCUMENTS

| 3,150,372 A | * | 9/1964 | Groth, Jr. ................... 342/387 |
| 3,863,256 A | * | 1/1975 | Smith .......................... 342/451 |
| 3,863,257 A | * | 1/1975 | Kang et al. .................. 342/458 |
| 4,024,383 A | * | 5/1977 | Beasley ....................... 342/388 |
| 4,558,323 A | * | 12/1985 | Golinsky .................... 235/411 |
| 4,916,455 A | * | 4/1990 | Bent et al. ............. 340/825.49 |
| 5,241,313 A | * | 8/1993 | Shaw et al. .................... 342/13 |
| 5,452,211 A | * | 9/1995 | Kyrtsos et al. ......... 342/357.01 |

FOREIGN PATENT DOCUMENTS

| EP | 701334 A2 | * | 3/1996 | ........... H04B/7/005 |
| EP | 767594 A2 | * | 4/1997 | ............ H04Q/7/38 |

* cited by examiner

*Primary Examiner*—Gregory C. Issing
(74) *Attorney, Agent, or Firm*—Terri S. Hughes; Valerie M. Davis

(57) ABSTRACT

A first signal and a second signal are detected. The first and second signals are transmitted according to a timing pattern. An arrival time is identified for the first and second signals. Based on the timing pattern and the estimated arrival times of the first and second signals, a set of parameters is derived that characterize a timing relationship between a first device (100) and a second device (200).

20 Claims, 5 Drawing Sheets

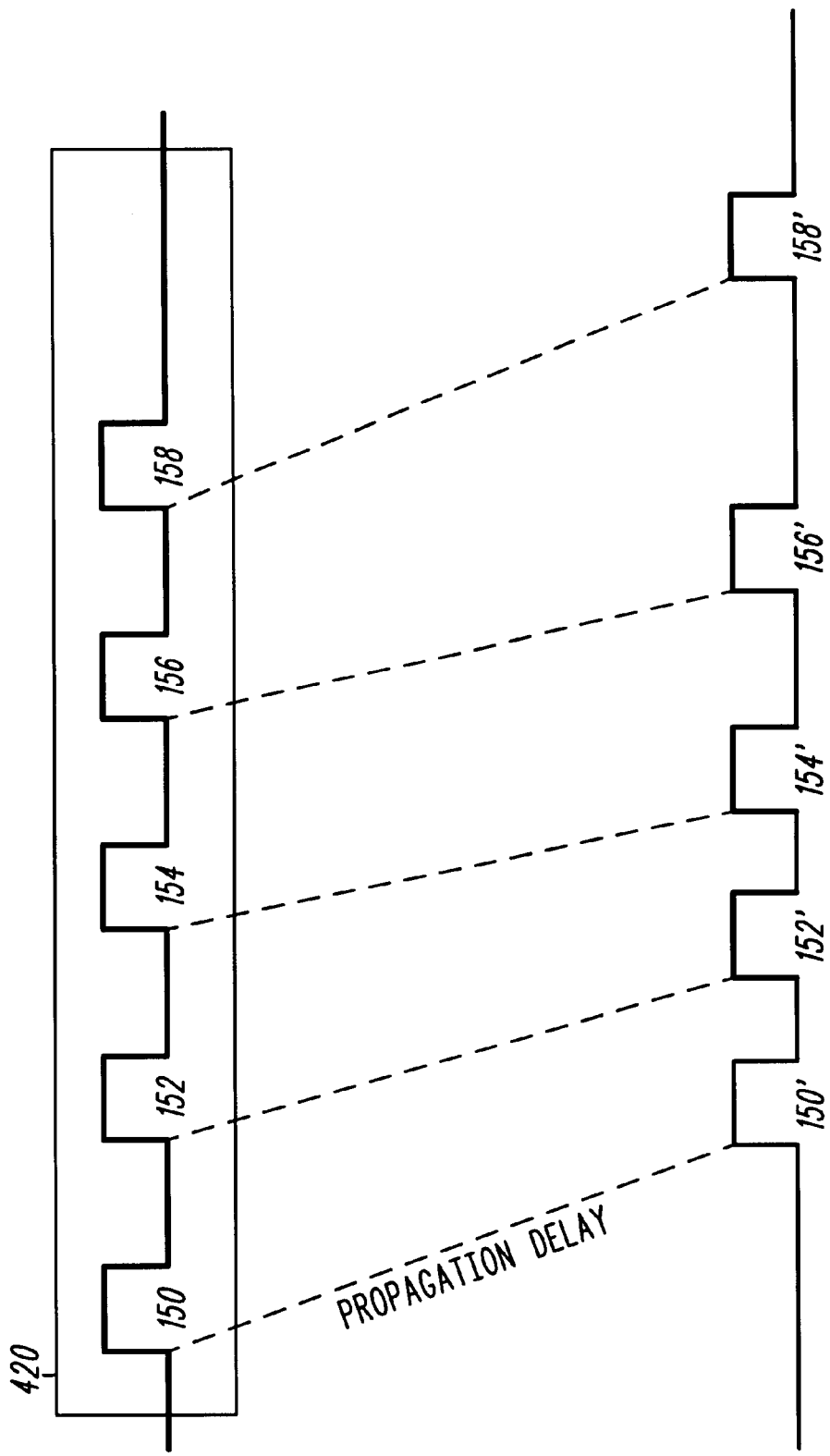

TIMING ESTIMATION METHOD AND APPARATUS FOR A LOCATION SYSTEM

FIELD OF THE INVENTION

The present invention relates generally to a timing estimation method and apparatus for a location system, for example, a time difference of arrival ("TDOA") system, a global positioning system ("GPS"), or the like.

BACKGROUND OF THE INVENTION

Conventional location and tracking systems employ either location or tracking algorithms. In a time difference of arrival ("TDOA") system, for example, there are often requirements for both location and tracking algorithms. Location algorithms derive a location from a set of readings. Location algorithms are often preferable due to the immediacy of the result; however, location algorithms are more susceptible to erroneous or missing arrival time reports than tracking algorithms. Moreover, location algorithms are limited by the necessity of having a sufficient number of arrival time reports on a single event, and rely entirely on the accuracy of those reports. Current location algorithms are capable of generating a location from a single set of arrival time reports, but require that such a set contain arrival time estimates from several receivers on the same transmission. This dramatically compounds the sensitivity of the system to erroneous or missing reports from a reporting site. Further, current location algorithms are vulnerable to transient errors in the arrival time reports.

Tracking algorithms, such as Kalman filter-based tracking solutions, derive a velocity model from a series of reports from various stations before any accurate locations can be displayed. With the Kalman filter-based tracking solutions, for example, the filter constants control the accuracy of the long-term result at the expense of response time. Tracking algorithms give smoother results in the long term and are more ergonomically acceptable than location algorithms. However, although tracking algorithms are less dependent on individual events, tracking algorithms require several sets of time arrival reports in order to stabilize the velocity model, and tracking algorithms cannot generate accurate information until they have sufficient historical data. Moreover, tracking algorithms have a settling time that delays or introduces errors to the displayed result. Further, while tracking algorithms tend to average out small perturbations in the incoming data, larger perturbations can have lasting and highly disruptive effects.

Another disadvantage with the prior art is the loading of the location engine. The location engine is tasked with calculating the location of the target device from the timing reports. Because the Kalman filter-based tracking solution requires information from all reporting sites to maintain the velocity model, this computation cannot be easily distributed to other system components. Existing systems may suffer from performance limitations due to the loading of the location engine by a large number of target devices, each target device requiring separate filter iterations for each report.

Moreover, the location engine receives individual timestamps for each signal from a plurality of reporting sites, and is required to perform a calculation on the plurality of individual timestamps received from a plurality of reporting sites to locate the target device. Thus, the location engine has to process each report from each reporting site about each target device, so the processing power of the location engine limits the number of target devices that can be supported at a given rate. Such a task is time-consuming due to the number of individual timestamps received.

Thus, there exists a need for a method which will provide: a prompt response as exhibited by location algorithms; the kind of information and accuracy exhibited by tracking algorithms; a high tolerance to erroneous or missing reports; and a simple and easy way to distribute processing among system components.

BRIEF DESCRIPTION OF THE DRAWINGS

A preferred embodiment of the invention is now described, by way of example only, with reference to the accompanying drawings in which:

FIG. 5 illustrates a burst of transmissions sent from a target device when the target device is moving past the network device in accordance with the preferred embodiment of the present invention.

DETAILED DESCRIPTION OF THE PREFERRED EMBODIMENT

The present invention addresses locating a target device relative to a network device, preferably having a known location. The present invention derives a set of parameters that characterize a timing relationship between a first device and a second device based on a timing pattern used by the first device to transmit signals, and based on arrival times of the signals detected/estimated by the second device. In other words, the second device analyzes the timing pattern and the arrival times of a plurality of signals and derives a set of parameters characteristic of the timing relationship between two devices. The second device, or any other suitable device, can then use the set of parameters to interpolate or extrapolate estimated arrival times of a reference signal. In accordance with the present invention, the reference signal does not necessarily need to be detected by the second device, or even transmitted by the first device. As such, the present invention provides a measure of stability resulting from the averaging of signals over time received at a single device, and also allows for interpolation and/or extrapolation of missing reports/signals from a single device or from various devices in the system.

Figure 1:
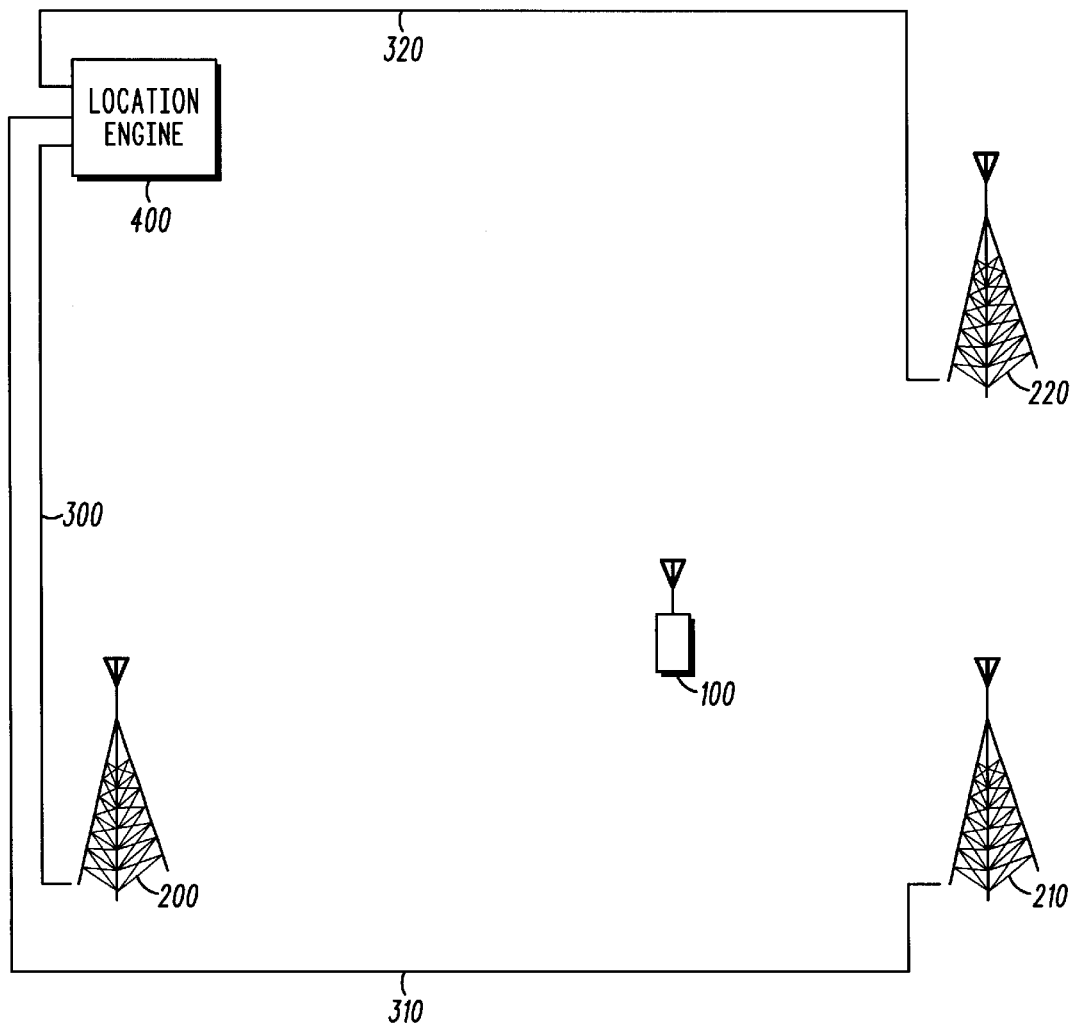
FIG. 1 illustrates a network-based location system in which the location of a target device is estimated by a location engine connected to a network of devices in accordance with the preferred embodiment of the present invention.

FIG. 1 illustrates a typical network-based time difference of arrival ("TDOA") system having a target device 100 and a plurality of network devices 200, 210, 220 (e.g., base stations). It is assumed that the network devices 200, 210, 220 are synchronized with each other or with an external reference in such a way that makes it possible for their reference clocks to be compared meaningfully with each other. It is not necessary, for the purposes of this invention, for the reference clock of the target device 100 to be synchronized with the reference clocks of the network devices 200, 210, 220.

Figure 2:
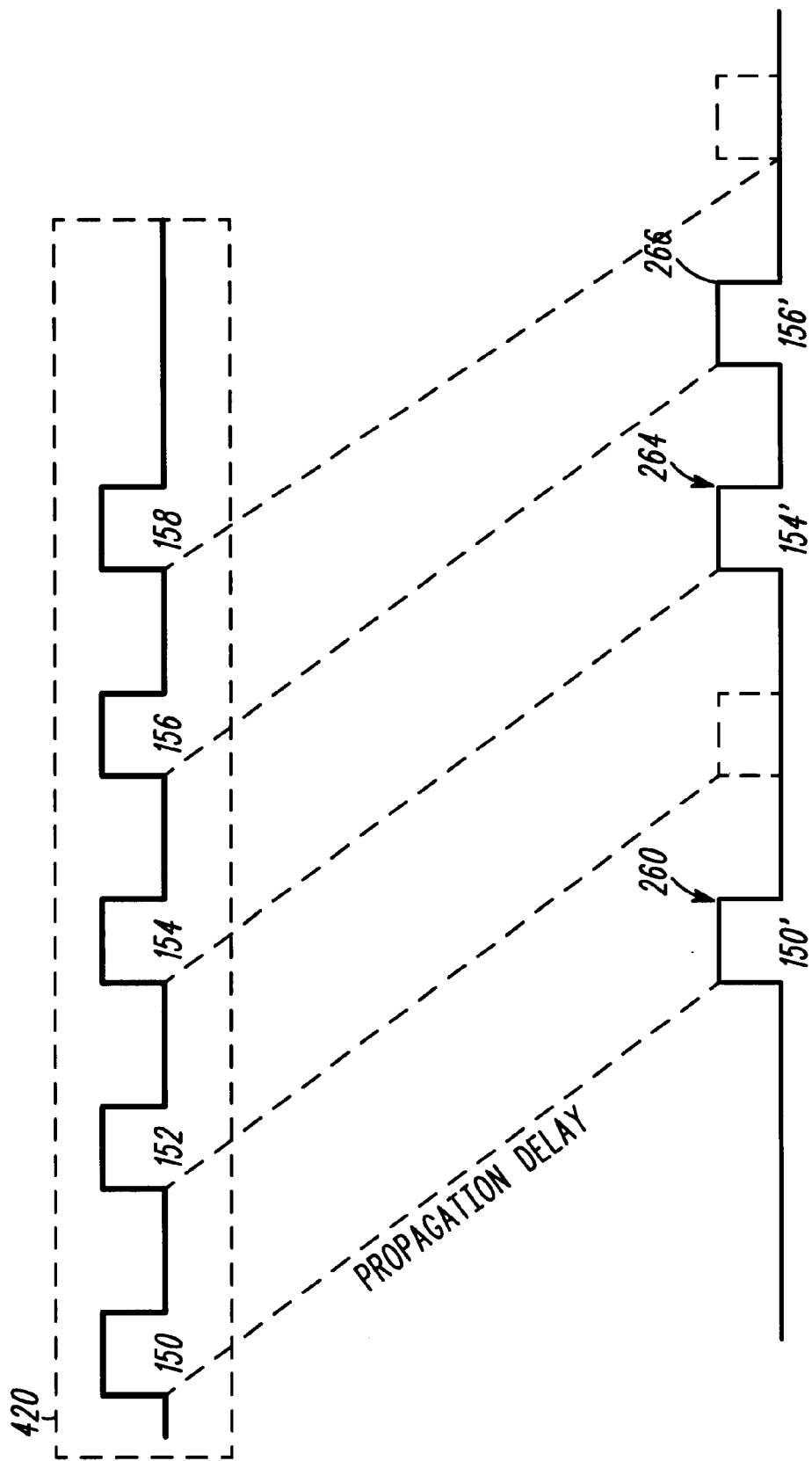
FIG. 2 illustrates a burst of transmissions sent from a target device, some of which are detected by one of the network devices in accordance with the preferred embodiment of the present invention.

In operation, as shown in FIG. 2, the target device 100 transmits a series of signals 150, 152, 154, 156, 158 within a certain time span 410 over which the velocity of the target device 100 is not expected to change significantly, such as, for example, five hundred (500) milliseconds. This series of transmissions is referred to as a burst 420. The duration of the burst 420 and the number of transmissions used in the burst may be varied depending on the application. In some cases, a continuous stream of transmissions may be used instead of a burst.

If and when signals in the burst 420 are detected at a network device 200, the network device calculates a timestamp 260, 264, 266 for each signal successfully detected 150', 154', 156'. The timestamp 260, 264, 266 represents the time at which the detected signal 150', 154', 156' was detected at the network device 200 according to the reference clock of the network device 200. While the network device 200 is used as an example, it is assumed that the other network devices 210, 220 in the system perform similar operations.

In the present invention, each signal 150, 152, 154, 156, 158 in the burst 420 may be identified as having been transmitted according to a timing pattern, either explicitly by sending this timing information as part of a data message, or implicitly through a predetermined protocol known a priori to both the target device 100 and the network devices 200, 210, 220. The predetermined protocol can be initiated either by the target device 100 or the network device 200. In this manner, each successfully detected signal 150', 154', 156' is associated with both a transmitted time, according to the reference clock of the target device 100, and an arrival time, according to the reference clock of the network devices 200, 210, 220. Please note that not all of the signals 150, 152, 154, 156, 158 sent by the target device 100 were represented in the set of signals 150', 154', 156' detected by the network device 200. Moreover, it is not necessary for the purposes of this invention that a network device successfully or fully decodes the detected signals, although this will generally be the case.

In accordance with the present invention, based on the timing pattern and the arrival times of the signals, the network device 200 derives a set of parameters that characterize the timing relationship between the first device and the second device. In the preferred embodiment, the parameters are generated from historical data of arrival times of signals from the target device 100 using a least-squares polynomial fit, and each arrival time estimate may be weighted according to the number and age of the composite signals, however, other techniques can be used to generate the parameters.

In accordance with the preferred embodiment of the present invention, the second-order polynomial approach results in a characteristic curve $y=ax^2+bx+c$, where the y parameter represents the calculated timestamp 260, 264, 266 by the network device, and the x parameter represents the time that the signal was originated according to the reference clock of the target device 100. When the curve is expressed in that form:

the a parameter represents the instantaneous acceleration of the target device 100 relative to the network device 200 along a line passing through the target device 100 and the network device 200;

the b parameter represents the instantaneous speed of the target device 100 relative to the network device 200 along a line passing through the target device 100 and the network device 200, plus a clock speed offset between the target device 100 and the network device 200, which will be identical for all network devices 210, 220; and the c parameter represents the propagation delay between the target device 100 and network device 200, plus a synchronization error between the target device 100 and network device 200, which will be identical for all network devices 210, 220, and thus will cancel out in a TDOA system.

It is apparent to those skilled in the art that the set of parameters derived by the network device 200 may be used to characterize the position of the target device 100 in the same manner as a conventional TDOA system, either by using the c parameter above or by choosing a reference signal (e.g., 158) in the burst 420 to use as a reference and reporting an estimate of the timestamp of the reference signal, whether the reference signal was detected or not by any given network device 200. The target device 100 may not have even transmitted the chosen reference signal; the reference signal is simply a common reference point among the network devices.

The timestamp is calculated by determining the transmit time of the reference signal and substituting it for the x parameter in the above equation; the value of the y parameter may then be reported as the timestamp of the reference signal at a given network device 200. It is important to note that in accordance with the present invention, as long as the curve can be constructed from the detected signals, it is not necessary for all network devices 200, 210, 220 used in the calculation to have detected any particular signal or, in fact, any common signal at all.

The propagation delay, reflected in the c parameter above and in any reported timestamp, is related to the distance between the target device 100 and network device 200 by the propagation speed of the signal. In the case where the target device 100 is portable and the network device 200 is fixed, the values of the c parameter, as reported by a set of network devices, may be used to estimate the location of the target device 100 relative to the set of network devices using techniques known in the art. In systems, such as global positioning systems ("GPS"), where the position of the transmitting devices are known and the position of the receiving device is to be determined, the c parameters may be used to determine the location of the receiving device relative to the transmitting devices.

Figure 3:
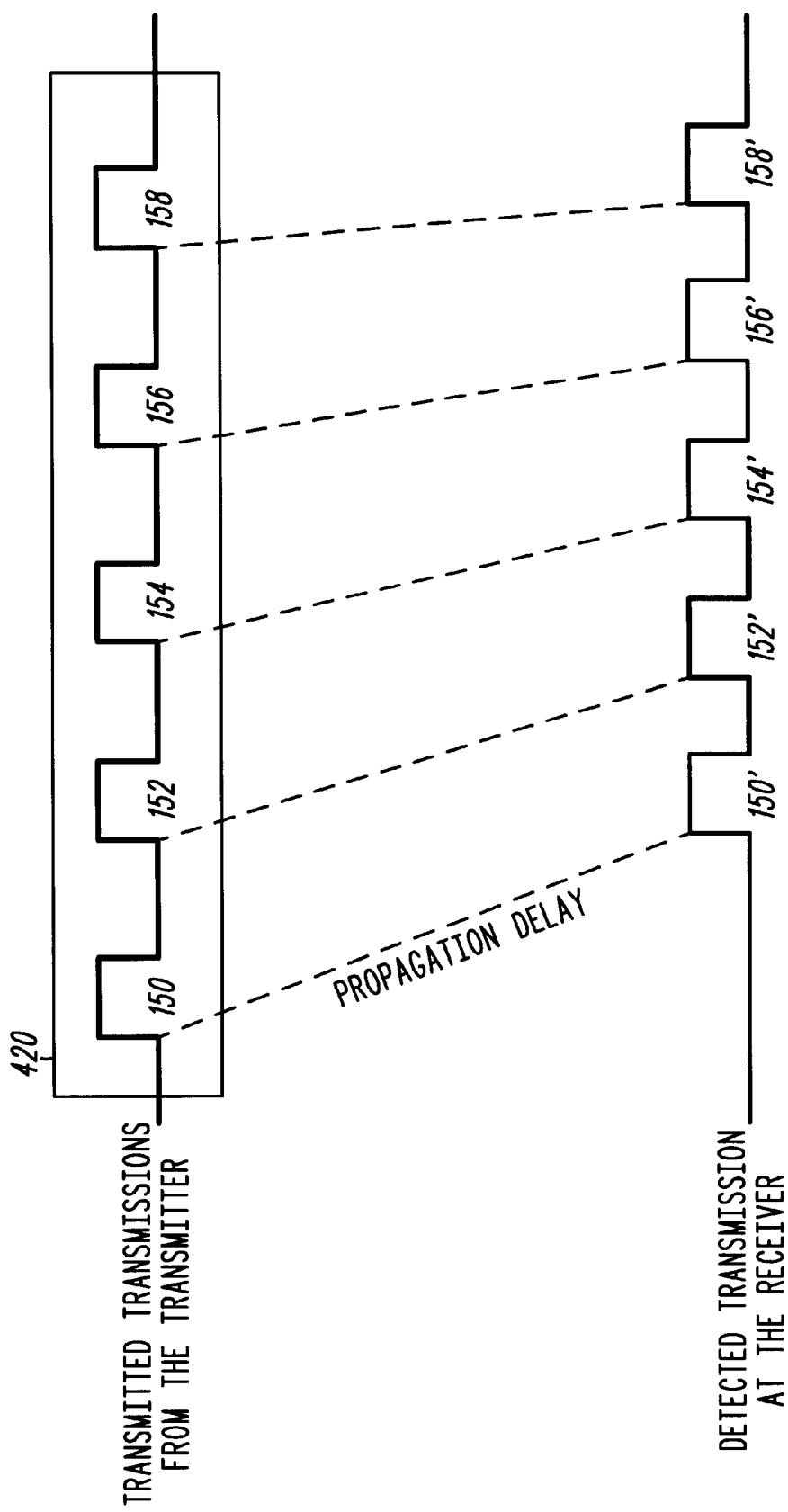
FIG. 3 illustrates a burst of transmissions sent from a target device when the target device is moving toward a network device in accordance with the preferred embodiment of the present invention.
Figure 4:
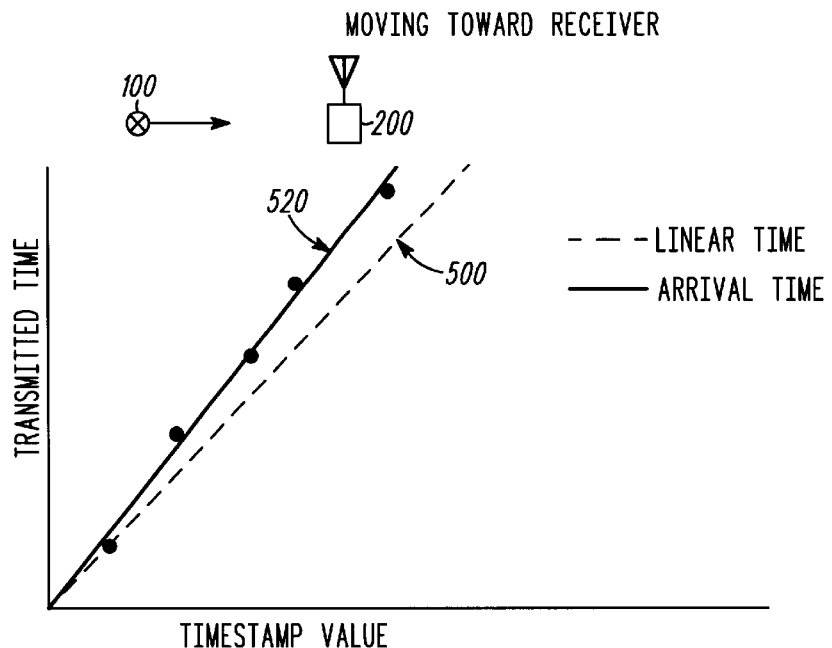
FIG. 4 illustrates a plot curve fit plotting time versus a timestamp value in accordance with the preferred embodiment of the present invention under the conditions described by FIG. 3.

Similar techniques may be applied to calculate the velocity and acceleration vectors from the individual linear parameters, a and b. FIG. 3 illustrates the relationship between the transmitted signals 150, 152, 154, 156, 158 in a burst 420 and the detected signals 150', 152', 154', 156', 158' in the case where the target device 100 is moving toward the network device 200 at a constant speed. Because the distance between the target device 100 and the network device 200 is becoming smaller over time, the time between successive detected signals 150', 152', 154', 156', 158' is smaller than the time between successive transmitted signals 150, 152, 154, 156, 158. This is illustrated graphically in FIG. 4, where the slope of the curve 520 fitted to the timestamps of the detected signals illustrates a different slope than the reference line 500, which would be produced by a stationary target device. For purposes of clarity, FIG. 4 ignores the propagation delay. The slope of the line is reflected in the b parameter in the above equation.

Figure 6:
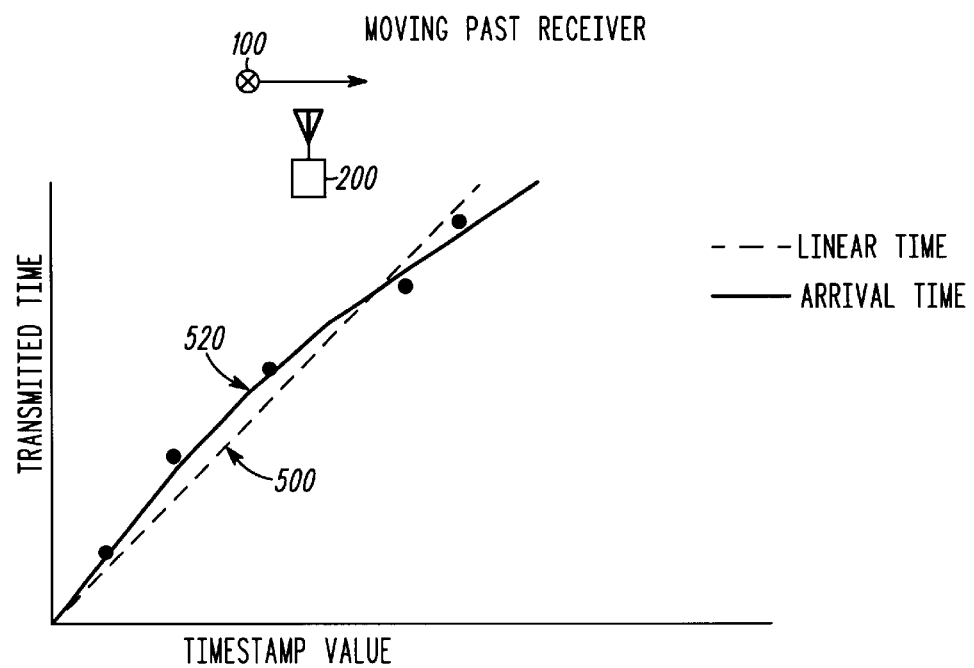
FIG. 6 illustrates a plot of a curve fit plotting time versus a timestamp value in accordance with the preferred embodiment of the present invention under the conditions described by FIG. 5.

FIG. 5 illustrates the relationship between the transmitted signals 150, 152, 154, 156, 158 in a burst 420 and the detected signals 150', 152', 154', 156', 158' in the case where the target device 100 is moving past the network device 200 at a constant speed. Because the distance between the target device 100 and the network device 200 is decreasing as the target device 100 approaches the network device 200, and is increasing after the target device 100 moves past the network device 200, the time between successive detected signals 150', 152', 154' is smaller than the time between successive transmitted signals 150, 152, 154, and the time between successive detected signals 154', 156', 158' is greater than the time between successive transmitted signals 154, 156, 158. This is illustrated graphically in FIG. 6, where the slope of the curve 520 fitted to the timestamps of the detected signals illustrates a changing slope with respect to the reference line 500, which would be produced by a stationary target device. For purposes of clarity, FIG. 6 ignores the propagation delay. The rate of change of the slope of the line is reflected in the a parameter in the above equation.

Several other techniques that are known in the art may be used other than the second-order polynomial least-squares curve fit. For example, a higher order polynomial or a spline may be used, or predictive filtering could be applied rather than a direct curve fit.

Thus, the present invention performs an averaging on the input data, allowing on-demand activation of a location algorithm as well as weighted interpolation or extrapolation of arrival times to improve the report accuracy. Since the calculation is performed exclusively on reports from a single network device 200, the network device 200, instead of the location engine 400, may perform the calculation. Performing this calculation at the network device 200 reduces the load on both the location engine 400 and the data link 300, which may carry only the results of the calculation rather than all of the raw data. Thus, the present invention does not require the associated stabilization time required by tracking algorithms operating on the raw input data. With such a load reduction on the location engine 400 and the data links 300, and performing averaging algorithms on a set of data received at a given network device, the present invention improves speed, accuracy and reliability to a location system. It will be appreciated by those skilled in the art that speed, accuracy and reliability in a location system is critical in certain environments, such as hostile or mission critical environments, for example, search-and-rescue missions, inside downed structures, police and fire rescues inside structures, and the like.

In accordance with the present invention, the information provided (e.g., the timing pattern and the estimated arrival times), however, is sufficient to not only estimate the arrival time of any of the undetected signals or improve the accuracy and reliability of a detected signal, but it also allows the target device 100 to be characterized in other ways, such as, but not limited to, relative velocity, relative acceleration, relative clock offset, relative clock drift, and rate of change of the relative clock drift. For example, a second-order polynomial least-squares curve fit is used to characterize the detected signals and use this characterization to interpolate or extrapolate the arrival times of previously detected or undetected signals, giving relative velocity and acceleration data as a corollary effect.

Once the network devices 200, 210, 220 derive their respective set of parameters, or in the alternative, after they have estimated arrival times for a set of signals, including the reference signal, if applicable, the network devices 200, 210, 220 may report this timing information to a third device 400 through data links 300, 310, 320. The timing information reported to the third device may be timing-insensitive because the timing information has been established at the network devices 200, 210, 220 prior to forwarding to the third device 400. In the preferred embodiment, the third device 400 is a location engine, however, the third device 400 can be any other suitable device. For ease of understanding, the third device 400 will be referred to as a location engine 400 in the following description.

The location engine 400 uses the timing information (e.g., a set of parameters, estimated arrival times for a set of signals, estimated arrival time of the reference signal, or the like) derived individually at a plurality of network devices to estimate the location of the target device 100, assuming that the delay between the transmission of the signal from the target device 100 and the reception or estimation of the signal by at least one network device 200, 210, 220 is a function of the distance between the target device 100 and a given network device.

While conceived for a TDOA system, the present invention is also applicable to, but not limited to, other timing based systems as well as systems based on signal strength or angle of arrival ("AOA"). Instead of building a velocity model based on successive reports from the receiver network, the present invention performs a curve fit to the historical data for each network device. A second order curve fit is appropriate for this task, but other techniques may be used. In the preferred embodiment, the target velocity and acceleration are modeled as relatively constant over the reporting interval. For this reason, the reporting interval should be on the order of 1–10 seconds, but is not limited to such. For any given time, the system of the present invention can interpolate or extrapolate a projected arrival time of a signal for the target device, even if the signal was not detected at that time. Weighting of individual timestamps may be applied to the curve-fitting algorithm as appropriate to either emphasize newer or more reliable timestamps or to limit the effects of timestamps that diverge greatly from the estimated curve. Further, in accordance with the present invention, heuristic manipulation of the data may be performed to eliminate outlying reports and assign a confidence level to the result based on the residual error of the curve fit and the quantity and age of the contributing reports.

Some advantages of the present invention over current location algorithms are, but not limited to, the following: the ability to generate results without detection of any given signal by a plurality of receivers; the ability to improve the estimates of arrival times of specific signals by averaging over several signals; the ability to reduce network or data link traffic if curve fitting/averaging is performed at the network device; the ability to reduce the load on the location engine if curve fitting/averaging is performed at the network device; the ability to have an inherent confidence estimation based on curve fit and data characteristics; the ability to derive velocity and acceleration data from the curve fit parameters; and the ability to reject outlying reports.

Some advantages of the present invention over conventional tracking algorithms are, but not limited to, the following: the elimination of Kalman-filter settling requirements; improved immunity to transient errors; simplification of location algorithms; reduction in central processing unit loading for tracker-based on-demand reporting; and reduction in response time to velocity changes based on use of weighting.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, although the preferred embodiment of the present invention describes an inbound system where the target device acts as a transmitter and the network devices act as receivers, it will be appreciated by those skilled in the art that the present invention is equally applicable to an outbound system, such as a GPS, where the target device acts as a receiver and the network devices act as transmitters. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A timing estimation method used in a location system comprising the steps of:
    detecting at a second device a first signal and a second signal, the first and second signals are transmitted by a first device according to a timing pattern;
    measuring arrival times for the first and second signals; and
    based on the timing pattern and the measured arrival times of the first and second signals, deriving at least one parameter that characterizes an arrival time of a third signal.

2. The method of claim 1 further comprising the step of using the at least one parameter to estimate an arrival time of a reference signal at the second device, wherein the reference signal is one of the first signal, the second signal, and the third signal.

3. The method of claim 2 wherein the third signal was not detected by the second device.

4. The method of claim 2 further comprising the step of using the estimated arrival time of the reference signal for estimating a location of at least one of the first device and the second device.

5. The method of claim 2 further comprising reporting the estimated arrival time of the reference signal to a third device for estimating a location of at least one of the first device and the second device.

6. The method of claim 1 further comprising reporting the at least one parameter to a third device for estimating a location of at least one of the first device and the second device.

7. The method of claim 1 further comprising, based on the at least one parameter, estimating a location of at least one of the first device and the second device.

8. The method of claim 1 wherein the at least one parameter is selected from a group consisting of: an estimated arrival time of a signal, a ratio between a transmission rate and a reception rate of a set of signals; and a rate of change of a ratio between a transmission rate and a reception rate of a set of signals.

9. The method of claim 1 wherein the at least one parameter is used to improve an arrival time estimate of a signal detected by the second device.

10. The method of claim 1 wherein the transmit time is based on a reference timing device associated with the first device.

11. The method of claim 1 further comprising the step of, based on the at least one parameter, estimating a location of the first device relative to the second device.

12. The method of claim 1 further comprising the step of, based on the at least one parameter estimating a location of the second device relative to the first device.

13. The method of claim 1 wherein the timing pattern is established a priori at both the first device and the second device.

14. The method of claim 1 further comprising the step of, at the second device, receiving the timing pattern from the first device.

15. The method of claim 1 further comprising the step of, based on the at least one parameter, estimating a relative speed of the first device relative to the second device.

16. The method of claim 1 further comprising the step of, based on the at least one parameter, estimating a relative acceleration of the first device relative to the second device.

17. A first device for use in a location system adapted to receive a first signal and a second signal from a second device according to a timing pattern, to measure arrival times for the first and second signals, and based on the timing pattern and the measured arrival times of the first and second signals, to derive at least one parameter that characterizes an arrival time of a third signal.

18. The first device of claim 17 further adapted to use the at least one parameter to estimate an arrival time of a reference signal at the first device, wherein the reference signal is one of the first signal, the second signal, and the third signal.

19. A first device for use in a location system adapted to derive at least one parameter that characterizes an arrival time of a third signal based on a timing pattern according to which a first signal and a second signal are transmitted by a second device, and based on measured arrival times of the first signal and the second signal detected at a third device.

20. The device of claim 19 further adapted to use the at least one parameter to estimate an arrival time of a reference signal at the third device, wherein the reference signal is one of the first signal, the second signal, and the third signal.

* * * * *